(12) United States Patent
Willett et al.

(10) Patent No.: US 8,145,538 B2
(45) Date of Patent: Mar. 27, 2012

(54) QUOTE-TO-ORDER VALIDATION SYSTEM FOR HOUSING COMPONENTS

(75) Inventors: Francis G. Willett, Adrian, MI (US); Heather S. Price, Morenci, MI (US); Steven L. Hester, Toledo, OH (US)

(73) Assignee: Masco Corporation, Taylor, MI (US)

( * ) Notice: Subject to any disclaimer, the term of this patent is extended or adjusted under 35 U.S.C. 154(b) by 1530 days.

(21) Appl. No.: 11/179,039

(22) Filed: Jul. 11, 2005
(Under 37 CFR 1.47)

(65) Prior Publication Data

US 2007/0011018 A1      Jan. 11, 2007

(51) Int. Cl.
*G06Q 30/00* (2006.01)
(52) U.S. Cl. ...................... 705/26.4; 705/27.1
(58) Field of Classification Search .............. 705/27, 705/26

See application file for complete search history.

(56) References Cited

U.S. PATENT DOCUMENTS

| 6,810,401 B1* | 10/2004 | Thompson et al. | 707/101 |
| 2002/0107749 A1* | 8/2002 | Leslie et al. | 705/26 |

* cited by examiner

*Primary Examiner* — Robert M. Pond
(74) *Attorney, Agent, or Firm* — Carlson Gaskey & Olds PC

(57) ABSTRACT

A quote-to-order system builds an order for cabinets for a house directly from the quote provided to the builder. This reduces data entry time and errors. The system also validates the final order relative to the quote and relative to the builder's purchase order. The quote-to-order system takes the user step-by-step through the process of building an order based upon the quote. The quote includes the floorplans in the development, optional layouts and available styles of cabinets. The quote also associates each of these options with a set of SKUs representing the cabinet components and hardware that would be needed for those options. By building the order based upon the underlying quote to the builder, the order is guaranteed to have the correct SKUs and pricing.

10 Claims, 6 Drawing Sheets

| | | | | | | | | | |
|---|---|---|---|---|---|---|---|---|---|
| Quotes Number | Revision | Quote Status | Customer Name | Sales Rep | Sales Coordinator | Date Entered | Expiration Date | Locked Date | Quote ID |
| 102364 | 001 | A | PULTE CALIFO... | 514 | CO1 | 3/20/2002 | 12/31/2002 | | 573 |
| 111353 | 001 | A | MERILLAT COR... | 990 | CR2 | 7/31/2002 | 7/31/2003 | | 341 |
| 111528 | 001 | A | PULTE OH FOU... | 613 | CB1 | 8/14/2002 | 8/14/2003 | | 562 |
| 111534 | 001 | A | RYLAND AZ CO... | 900 | HP1 | 8/14/2002 | 8/31/2003 | | 572 |
| 111534 | 002 | A | RYLAND AZ CO... | 900 | HP1 | 8/15/2002 10... | 8/31/2003 | | 576 |
| 111535 | 001 | A | PULTE OH FOU... | 900 | HP1 | 8/15/2002 8:4... | 8/31/2003 | | 574 |
| 111555 | 001 | A | M/I HOMES CO... | 900 | HP1 | 8/19/2002 | 8/31/2003 | | 600 |
| 111556 | 001 | A | PULTE HOMES... | 900 | HP1 | 8/19/2002 8:3... | 8/19/2003 8:36:10... | | 603 |

Fig-2

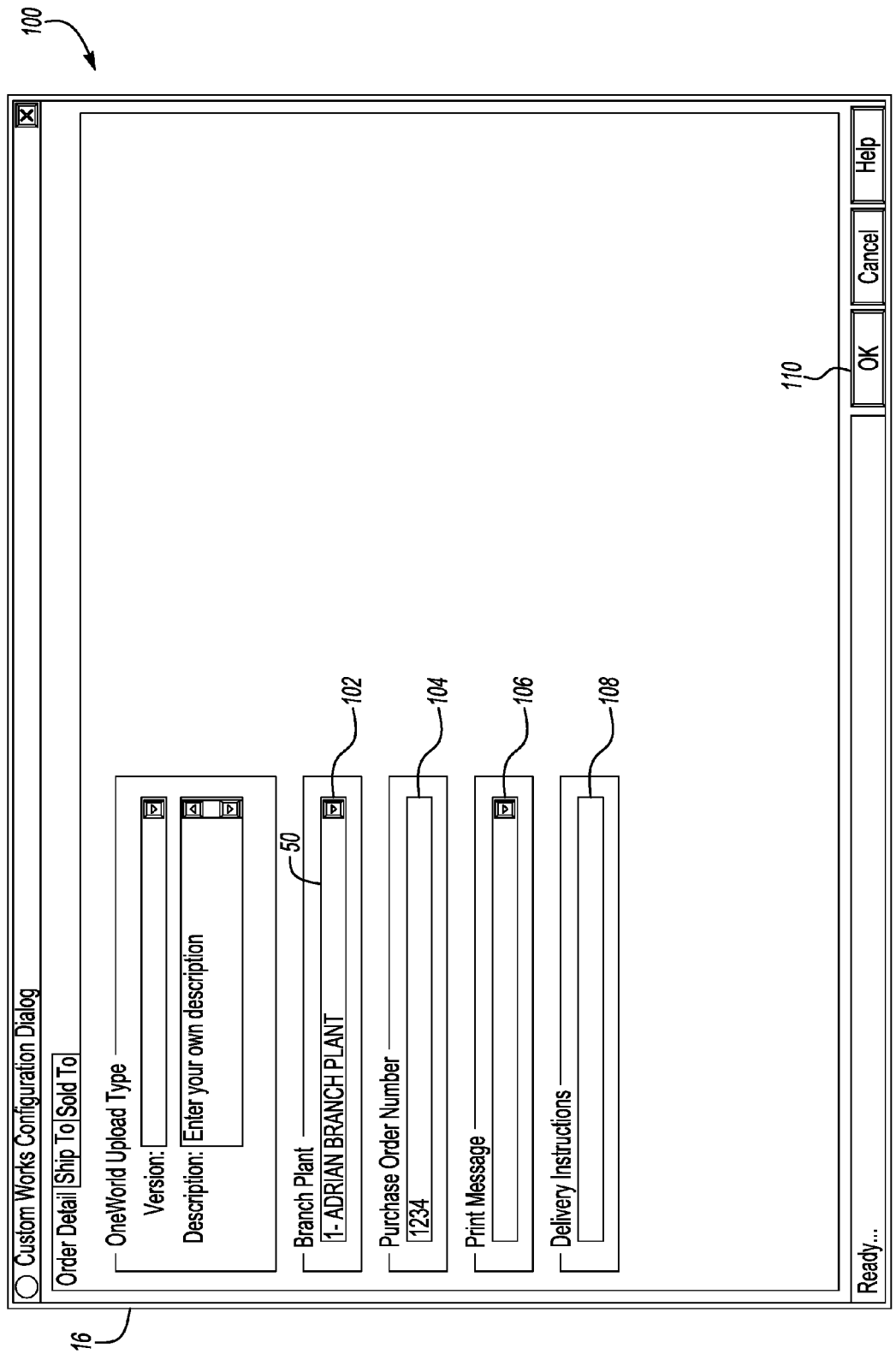

QUOTE-TO-ORDER VALIDATION SYSTEM FOR HOUSING COMPONENTS

BACKGROUND OF THE INVENTION

This invention relates to housing construction and more particularly to a system for converting and validating a quote for housing components, namely cabinets, to an order.

Generally, when a housing development is under construction a cabinet supplier for the development provides the builder with a quote for cabinets for the houses in the development. Several styles of cabinets are made available at different prices for selection by purchasers of the houses in the development. The housing development typically includes several floor plans, each with different requirements for cabinets. Each floor plan may further include optional layouts, such as an expanded kitchen or master bath, which would have different requirements for cabinets.

Previously, the cabinet supplier would provide a quote to the builder for each optional layout of each floor plan in each style of available cabinet. In that way, the builder could provide the range of options to the purchasers and the prices for each option. When the purchaser selected a floor plan, any optional layouts and cabinet style, the builder would communicate these selections to the cabinet supplier. The cabinet supplier would then create an order by entering the SKUs for each cabinet component and hardware that were necessary for the selected options. This re-entry of the data, including re-keying the SKUs, was time-consuming and prone to occasional errors.

SUMMARY OF THE INVENTION

A quote-to-order system according to the present invention builds an order for cabinets for a house directly from the quote provided to the builder. This reduces data entry time and errors. The system also validates the final order relative to the quote and relative to the builder's purchase order.

The quote-to-order system takes the user step-by-step through the process of building an order based upon the quote. The quote includes the floorplans in the development, optional layouts and available styles of cabinets. The quote also associates each of these options with a set of SKUs representing the cabinet components and hardware that would be needed for those options. By building the order based upon the underlying quote to the builder, the order is guaranteed to have the correct SKUs and pricing.

BRIEF DESCRIPTION OF THE DRAWINGS

Other advantages of the present invention can be understood by reference to the following detailed description when considered in connection with the accompanying drawings wherein:

FIG. 2 illustrates one possible computer screen for choosing a quote in the system of FIG. 1.

FIG. 6 illustrates a computer screen for finishing the order and sending it to an assembly plant.

DETAILED DESCRIPTION OF THE PREFERRED EMBODIMENTS

Figure 1:
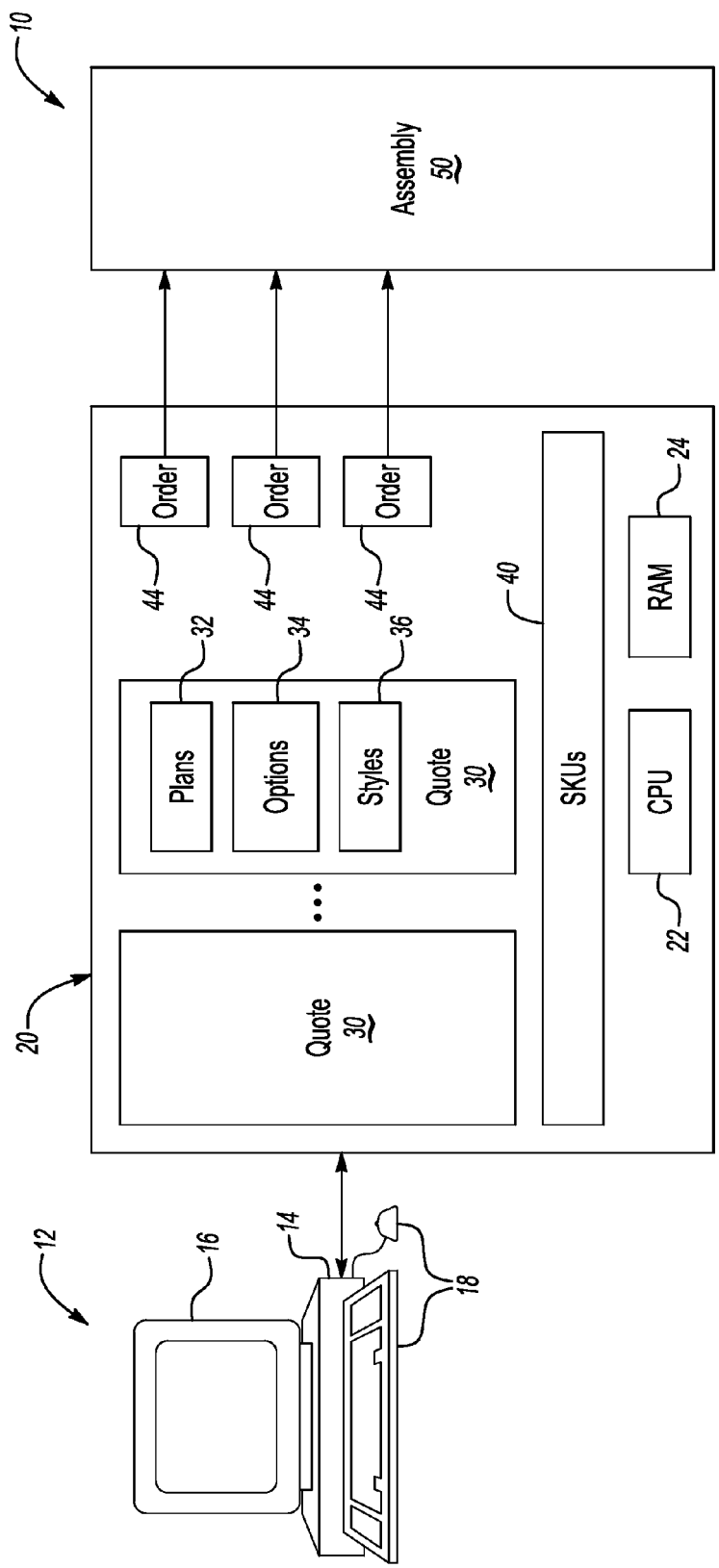
FIG. 1 is a schematic of one possible quote-to-order system according to the present invention.

A quote-to-order system 10 according to one embodiment of the present invention is shown schematically in FIG. 1. The system 10 includes one or more user computers 12 (one shown) each having a CPU 14, display 16 and user input devices 18. The user computer 12 is networked to a server 20 having a CPU 22 and storage media 24, such as RAM, hard drives, and any other computer storage storing software for performing the functions described herein. The storage media 24 further includes a database of a plurality of quotes 30. Each quote 30 (only one is shown in detail) stores information regarding the plans 32, layout options 34 and styles 36 associated with a different housing development. Each quote 30 associates each of the plans 32, options 34 and styles 36 with SKUs in a SKU database 40. The SKU database 40 lists SKUs associated with all cabinet components, in all styles, and associated hardware.

Pricing may be associated with each SKU in the SKU database 40, such that pricing is the same across quotes 30. Alternatively, pricing for each SKU may be stored in each quote so that pricing is different in each quote 30. Alternatively, pricing may be stored in both, so that default values in the SKU database 40 are used unless specified or modified in the quote 30.

Based upon the software and user inputs via user computer 12, the server 20 converts the quotes 30 to orders 44. The orders 44 contain the specific SKUs needed for a house, the total price, delivery date, delivery location, billing party, etc. The orders 44 are sent to an assembly plant 50 where the cabinets are assembled for each order 44. The user computer 12 may access software running on the server 20 via a web browser, for example.

Figure 3:
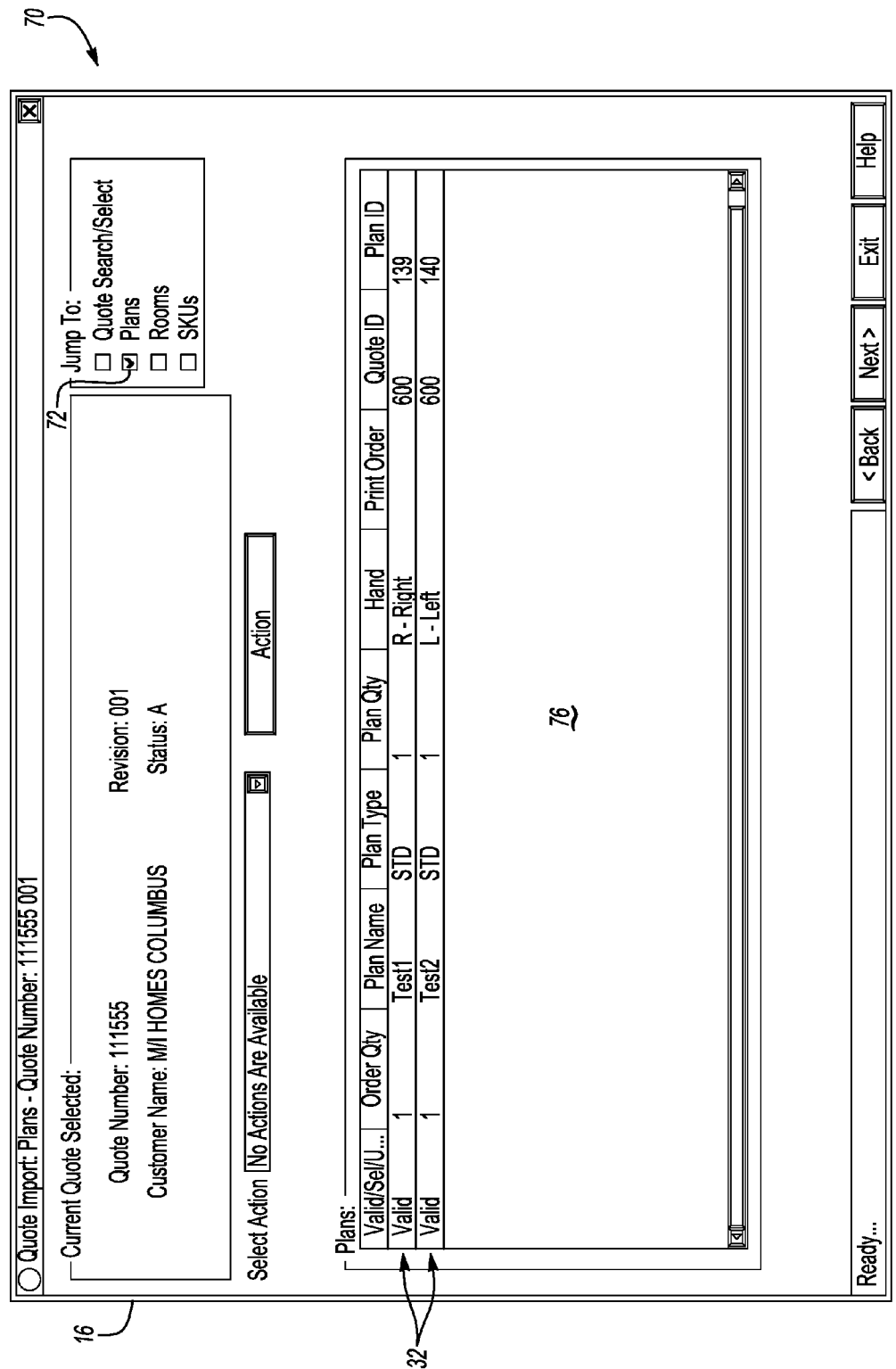
FIG. 3 illustrates a computer screen for choosing a plan in the system of FIG. 1.

A quote selection screen 60 to be displayed on display 16 of the user computer 12 by the server 20 is shown in FIG. 2. The user can choose the quote selection screen 60 by checking the "quote search/select" box 62. By optionally entering some search parameters in the search field 64, the user can bring up a list of quotes 30 in a "quotes found" field 66. The user then chooses the desired quote 30 by double-clicking on it, or by selecting it and clicking the "next" button 68, which then brings the plan selection screen 70 to the display 16, as shown in FIG. 3.

The user can return to the plan selection screen 70 by checking the "plans" box 72. In the plan field 76, the plans 32 associated with the quote 30 selected in the quote selection screen 60 (FIG. 2) are displayed. The user selects the requested plan 32 (named "Test 1" and "Test 2" in FIG. 3) and proceeds to the option and style selection screen 80, shown in FIG. 4.

In the option and style selection screen 80 (FIG. 4), the user chooses from among a plurality of rooms 84 with room options 85, e.g. two kitchen layouts and two master bath layouts, displayed in the room field 86. In addition, the user selects a cabinet style 36 from a style popup menu 88 (which materializes after clicking on the "product line" box). In this manner, the user selects the optional room layout 85 and a style 88. By clicking "next" or clicking the "SKUs" button at the bottom of the screen 80, the user moves to the SKU screen 90 shown in FIG. 5.

Figure 4:
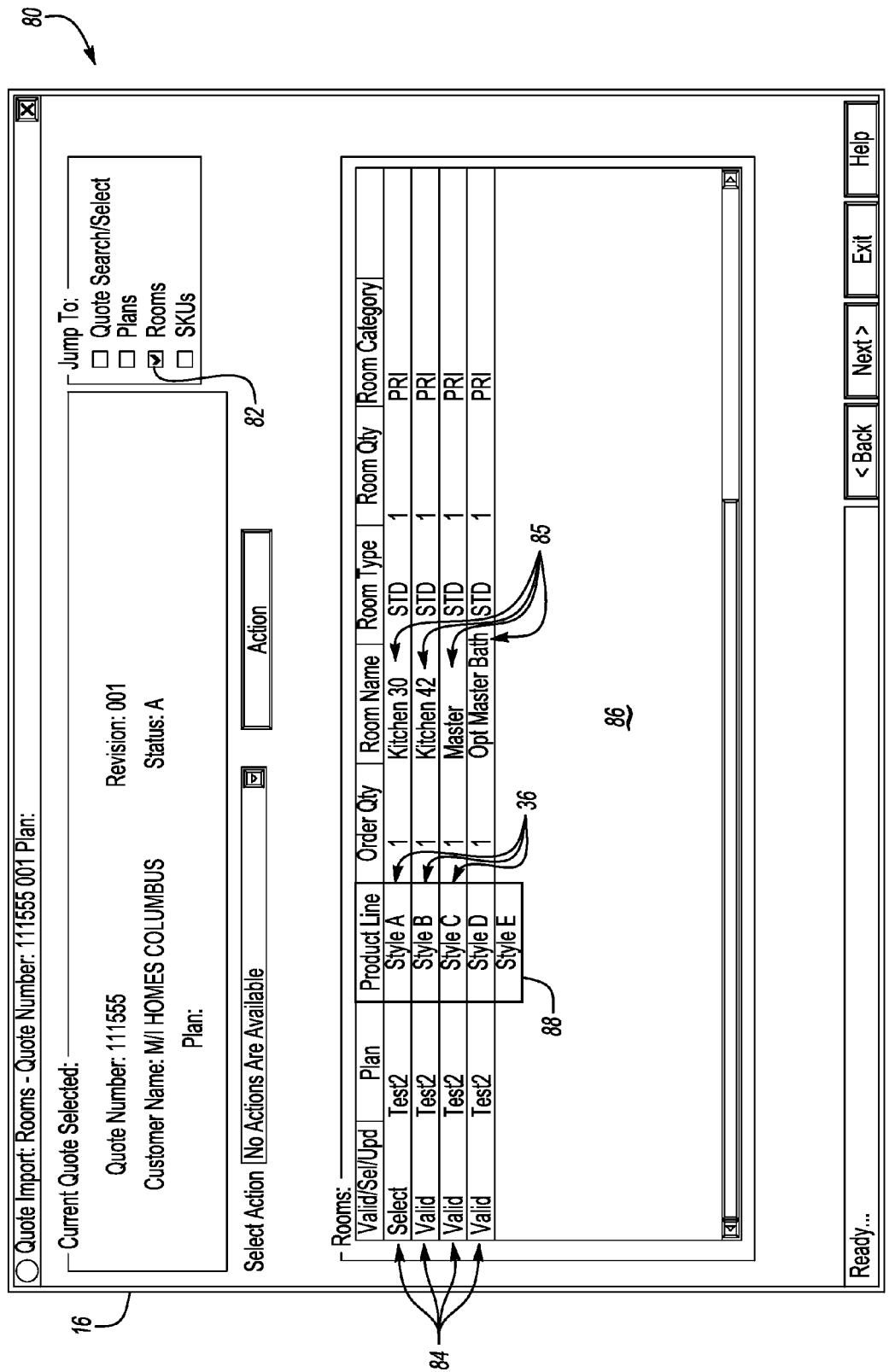
FIG. 4 illustrates a computer screen for choosing rooms, room options and styles.
Figure 5:
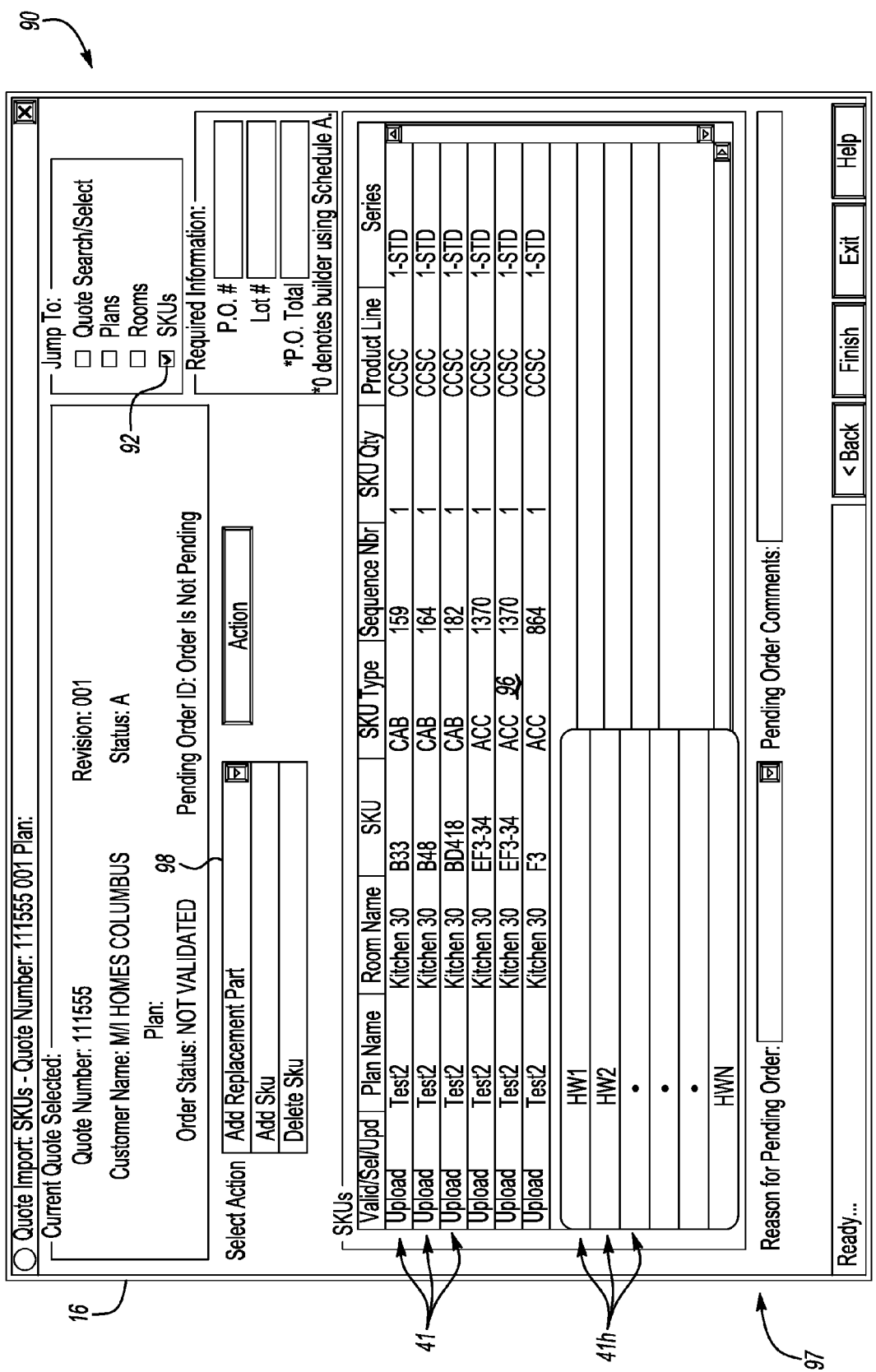
FIG. 5 illustrates a computer screen for reviewing and changing the SKUs selected by the system of FIG. 1 based upon the existing quote.

Referring to FIG. 5, the user can select the SKU screen 90 by choosing the SKUs checkbox 92. The SKU screen 90 displays a SKU list field 96 listing all of the SKUs 41 included in the order based upon the selections of the plan 32 (FIG. 3), the rooms 84, room options 85 and styles 88 (FIG. 4). By choosing "add SKU" or "delete SKU" from the "Select Action" popup menu 98, the user can manually add a SKU 41 from the SKU database 40 (FIG. 1) to the order even though it is not pulled automatically based upon the plan 32, rooms 84, room options 85 and styles 88 or delete a SKU 41 from the order even though it has been added to the order automatically.

In the SKU list field 96 is a SKU 41 for "Hardware." Double-clicking on the "Hardware" SKU 41h brings up a pulldown menu 97 listing a plurality of optional hardware SKUs 41h. The user selects one of the hardware SKUs 41h in the pulldown menu 97, which is then inserted into the SKU list field 96 as the pulldown menu 97 again disappears.

After the desired SKUs 41 are all in the order, the user clicks "Finish" which initiates a validation of the order. During validation, the total price of the order is compared to the builder's P.O. (if there was one) and the quote. If the total price of the order varies by more than a threshold amount from the P.O. or the quote, then the user is given the option of revising the order or sending the order to "pending" status. In "pending" status, the order is not sent to the plant 50 (FIG. 1) until a supervisor authorizes it.

If the order is validated, or if a supervisor authorizes it, the system then proceeds to the finalization screen 100, shown in FIG. 6. In the finalization screen 100, the user can choose from among a plurality of assembly plants 50 in a plant popup menu 102, enter the builder's P.O. number in a P.O. Field 104, add a print message in print message popup menu 106 and add delivery instructions in delivery field 108. Upon clicking the "OK" button 110, the order is then transmitted to the selected assembly plant 50. By building the order 44 (FIG. 1) directly from the quote 30 and the SKU database 40, the order process is more efficient and accurate.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A cabinet quote to order system comprising:
   a server comprising a quote database storing a plurality of quotes, each quote associating a list of cabinet component types with each of a plurality of rooms and a plurality of floorplans; and
   a computer connected to said server comprising a user interface for building an order based upon the quotes in the database by choosing from among the plurality of floorplans and from among the plurality of rooms, the order including a list of a plurality of cabinet part numbers.

2. The system of claim 1 wherein the quote database associates each of the plurality of floorplans with a plurality of cabinet styles, the user interface building the order by choosing from among the plurality of cabinet styles.

3. The system of claim 2 wherein the user interface displays a list of the plurality of quotes and permits a user to select one of the plurality of quotes from which to build the order.

4. The system of claim 3 wherein the user interface displays a list of the plurality of floorplans associated with the selected one of the plurality of quotes and permits the user to select from among the plurality of floorplans.

5. The system of claim 4 wherein the user interface displays a list of the plurality of rooms associated with the selected floorplan and permits the user to select from among the plurality of rooms.

6. The system of claim 5 wherein the user interface displays a list of the plurality of cabinet styles associated with the selected quote and permits the user to select from among the plurality of cabinet styles.

7. The system of claim 6 wherein the system transmits the order to an assembly plant.

8. The system of claim 6 wherein the system imports SKUs into the order based upon the selected floorplan, the selected room and the selected cabinet style.

9. The system of claim 8 wherein the system calculates a total price based upon the selected floorplan, the selected room and the selected cabinet style and based upon the selected quote.

10. The system of claim 9 wherein the system compares the total price to a price in the selected quote.

\* \* \* \* \*